(12) United States Patent
Srinivasan

(10) Patent No.: US 11,238,016 B1
(45) Date of Patent: Feb. 1, 2022

(54) SYSTEMS AND METHODS FOR AUTOMATED DATA INTEGRATION

(71) Applicant: Cigna Intellectual Property, Inc., Wilmington, DE (US)

(72) Inventor: Deenadhayalan Srinivasan, Ellicott City, MD (US)

(73) Assignee: Cigna Intellectual Property, Inc., Wilmington, DE (US)

( * ) Notice: Subject to any disclaimer, the term of this patent is extended or adjusted under 35 U.S.C. 154(b) by 0 days.

(21) Appl. No.: 17/000,403

(22) Filed: Aug. 24, 2020

(51) Int. Cl.
*G06F 16/00* (2019.01)
*G06F 16/21* (2019.01)
*G06F 16/25* (2019.01)

(52) U.S. Cl.
CPC .......... *G06F 16/214* (2019.01); *G06F 16/212* (2019.01); *G06F 16/254* (2019.01); *G06F 16/258* (2019.01)

(58) Field of Classification Search
CPC .... G06F 16/212; G06F 16/214; G06F 16/254; G06F 16/258
See application file for complete search history.

(56) References Cited

U.S. PATENT DOCUMENTS

| | | | |
|---|---|---|---|
| 7,149,730 B2 | 12/2006 | Mullins | |
| 7,555,493 B2 * | 6/2009 | Khayter | G06F 16/27 |
| 8,572,123 B2 | 10/2013 | Brock | |
| 9,330,157 B2 * | 5/2016 | Ducott, III | G06F 16/258 |
| 9,684,699 B2 | 6/2017 | Delgobbo | |
| 10,216,902 B2 | 2/2019 | Vesto | |
| 2002/0091702 A1 * | 7/2002 | Mullins | G06F 16/25 |
| 2003/0163784 A1 | 8/2003 | Daniel | |
| 2006/0294157 A1 | 12/2006 | Kumpitsch | |
| 2014/0136958 A1 | 5/2014 | Scattergood | |
| 2014/0137262 A1 * | 5/2014 | Stofberg | G06F 11/1453 726/26 |
| 2014/0220540 A1 | 8/2014 | Burgin | |
| 2016/0260023 A1 | 9/2016 | Miserendino, Jr. | |
| 2019/0026386 A1 * | 1/2019 | McWaters | G06F 16/258 |
| 2020/0125948 A1 | 4/2020 | Modi | |

FOREIGN PATENT DOCUMENTS

CN    107798069 A  *  3/2018

\* cited by examiner

*Primary Examiner* — Diedra McQuitery
(74) *Attorney, Agent, or Firm* — Stinson LLP

(57) ABSTRACT

A data integration server is provided for integrating data from multiple sources using configuration based metadata. The server includes a processor and a memory. The processor is configured to receive a library of object definitions defining relationships between a set of data elements and a set of data relationships in the source database. The processor is also configured to receive a collection of configuration data from the configuration database including information for mapping the source database to the target database. The processor is further configured to apply a metadata module to the collection of configuration data to generate a set of metadata information. The processor is additionally configured to generate data integration code. The processor is also configured to execute the data integration code to integrate a set of information from the source database in the target database.

20 Claims, 8 Drawing Sheets

US 11,238,016 B1

SYSTEMS AND METHODS FOR AUTOMATED DATA INTEGRATION

FIELD OF INVENTION

The field relates to systems, methods, and architectures for applying a metadata model and automated code generation to provide automated data integration.

BACKGROUND OF THE DISCLOSURE

In many modern data centers, there is significant demand for data integration in order to support business services such as data analytics. However, in many examples, data integration is technically onerous, resource intensive, and time consuming. Known data integration approaches involve time-consuming steps to define data models, define data relationships, perform data migration using extract, load, and transfer ("ETL") tools, and develop, test and apply numerous database queries. In addition to taking significant time, these approaches require significant code development and significant financial and operational expenditures. Further such data integration often requires maintenance and support. Further, known data integration approaches have significant technical limitations including dependencies on data model and data relationship accuracy.

Accordingly, enhanced data integration tools are desired that overcome the known technical and other deficiencies of prior data integration tools. As such, systems and methods for enhanced automated data integration are desired.

BRIEF SUMMARY OF THE INVENTION

In one aspect, a data integration system is provided for integrating data from multiple sources using configuration based metadata. The system includes a source database, a target database, a configuration database, and a data integration server. The data integration server includes a processor and a memory. The data integration server is in communication with the source database, the target database, and the configuration database. The processor is configured to receive a library of object definitions defining relationships between a set of data elements and a set of data relationships in the source database. The processor is also configured to receive a collection of configuration data including information for mapping the source database to the target database. The processor is further configured to apply a metadata module to the collection of configuration data from the configuration database to generate a set of metadata information. The processor is additionally configured to apply the set of metadata information and the library of object definitions to a code generation module to generate data integration code. The processor is also configured to execute the data integration code to integrate a set of information from the source database in the target database.

In another aspect, a data integration server is provided for integrating data from multiple sources using configuration based metadata. The server includes a processor and a memory. The server is in communication with a source database, a target database, and a configuration database. The processor is configured to receive a library of object definitions defining relationships between a set of data elements and a set of data relationships in the source database. The processor is also configured to receive a collection of configuration data including information for mapping the source database to the target database. The processor is further configured to apply a metadata module to the collection of configuration data from the configuration database to generate a set of metadata information. The processor is additionally configured to apply the set of metadata information and the library of object definitions to a code generation module to generate data integration code. The processor is also configured to execute the data integration code to integrate a set of information from the source database in the target database.

In yet another aspect, a method is provided for integrating data from multiple sources using configuration based metadata. The method is performed by a data integration server that is in communication with a source database, a target database, and a configuration database. The method includes receiving a library of object definitions defining relationships between a set of data elements and a set of data relationships in the source database. The method also includes receiving a collection of configuration data including information for mapping the source database to the target database. The method further includes applying a metadata module to the collection of configuration data from the configuration database to generate a set of metadata information. The method also includes applying the set of metadata information and the library of object definitions to a code generation module to generate data integration code. The method further includes executing the data integration code to integrate a set of information from the source database in the target database.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

In the drawings, reference numbers may be reused to identify similar and/or identical elements.

DETAILED DESCRIPTION

Figure 1:
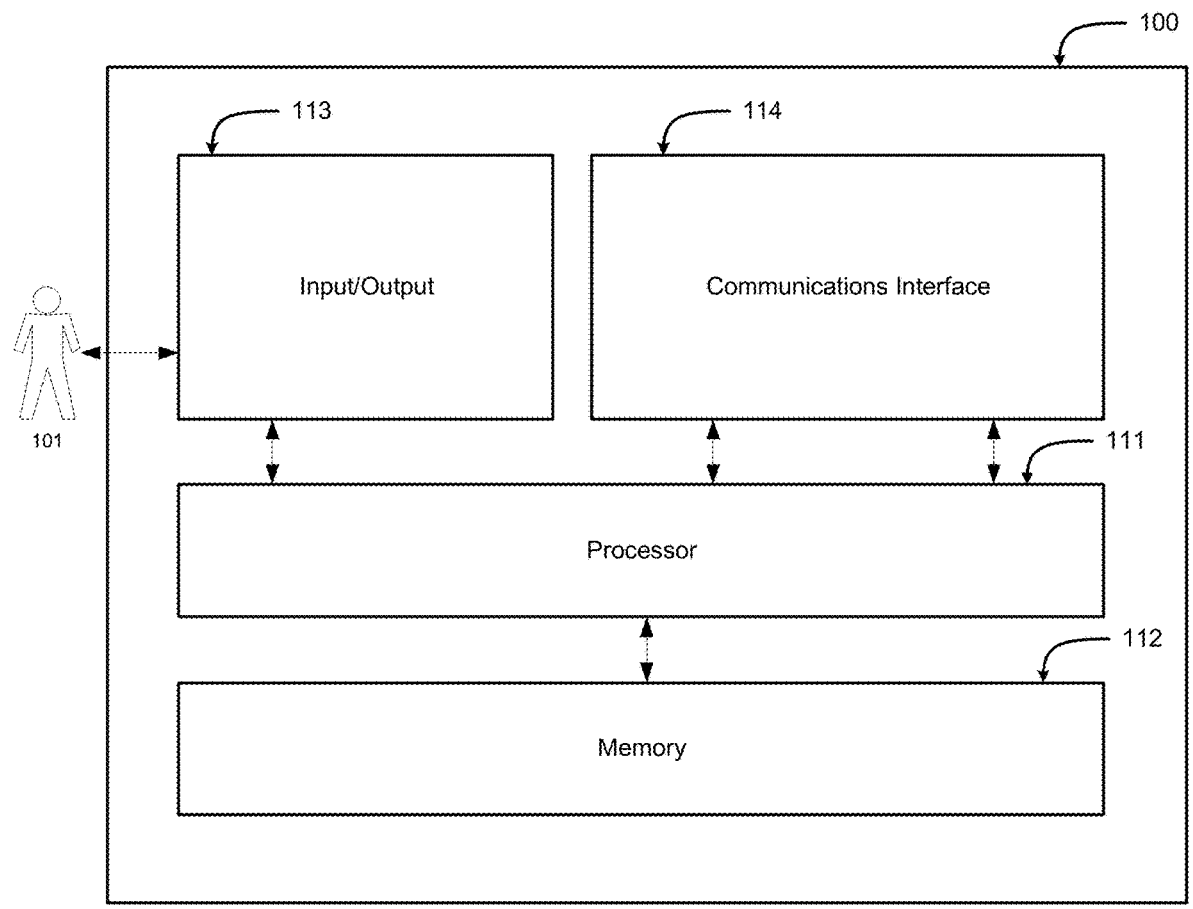
FIG. 1 is a functional block diagram of an example computing device that may be used in the data integration system described.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

As used herein, the term "data integration" refers to an approach to bring together multiple sources of data from a first location (a "source") for analysis at a second location (a "target") such that the data can be processed together using a variety of analytic tools. In the example system described herein, the systems and methods provide a data integration system. A data integration system typically is used to facilitate reporting, business intelligence, business analytics, and vendor extracts.

As used herein, the term "extract, transform, load" or "ETL" refers to an approach of extracting data from one or more data sources, transforming the data to a new context than that of the source, and loading the data into a new data target. Data extraction involves extracting data from homogeneous or heterogeneous sources. Data transformation processes data by data cleansing and transforming the cleansed data into a proper, homogenous storage format and structure for the purposes of querying and analysis. Data loading describes the insertion of data into the final target database such as an operational data store, a data mart, a data lake, or a data warehouse.

As used herein, the term "data schema" (or "database schema") is the structure of a particular database described in a formal language supported by a database management system ("DBMS") used to implement the particular database. The term "schema" refers to the organization of data as a blueprint of how the database is constructed (divided into database tables in the case of relational databases). All constraints are expressible in the same formal language. A database can be considered a structure in realization of the database language.

In many modern data centers, there is a significant demand for tools to integrate large data sets (collectively "data integration") to support critical functions including data analytics, business intelligence, operational systems, financial systems, and other systems, along with creating data warehouses. However, in many examples, known approaches to data integration have significant technical deficiencies.

For example, known data integration approaches require active definitions of data models and data relationships and complex data migration using ETL tools. Further, such integration approaches require developers to create, test, and implement database queries. These approaches have several technical deficiencies. First, because they are dependent on the accuracy of data modeling and relationship description, there is a significant risk of errors in implementation. Second, these approaches are reliant on manual code development and testing and thus bear further risk of errors and inefficiencies from these steps. In addition to such risk and inefficiency, these approaches require financial and operational expenditures. Further such data integration often requires maintenance and support.

To overcome these known deficiencies, a data integration server and system is provided. The data integration server and system apply a configuration based model to integrate data using automatically generated dynamic code. In particular, the data integration server includes multiple component modules for data integration. The modules include: (1) a library module for defining and processing libraries of object definitions defining relationships between a set of data elements and a set of data relationships in source databases; (2) a configuration module for defining and processing configuration data including (i) mapping information for mapping the source database(s) to the target database, transformation rules, default values, business keys, and column sequence, (ii) process information for defining and processing process names, target objects, refresh methods, refresh frequencies, snapshot configurations, process methods (e.g., single-step or multi-step), refresh type, and snapshot management, and (iii) and filter information for defining and processing filter configuration information applied in data selection; (3) a metadata module for converting configuration data into a set of metadata; (4) a code generation module used to process the metadata and libraries into data integration code; (5) a code execution module for managing, deploying, and executing the data integration code; and (6) a snapshot management module for managing and executing snapshots of integrated data (e.g., data marts).

Using these component modules and other features described herein, the data integration server and system provide technological solutions to the problems of data integration described herein. Notably, the systems and methods described overcome known deficiencies in known data integration systems. For example, the data integration server avoids resource intensive query statements in source-to-target mapping that are required in known data integration systems, and thereby improves the functioning of databases. The data integration server also avoids manual generation of code for data integration required in known data integration systems and thereby avoids errors, inefficiencies, and risks which are common in such systems. Further, the modules described and the metadata model are novel improvements that are not conventionally known in computing. The modules and metadata model thus further represent improvements over known data integration systems.

Accordingly, the proposed data integration system described herein addresses the shortcomings, including the technological problems, using technological solutions. Specifically, by applying a configuration driven approach to dynamically and automatically generate data integration code based on unique metadata models, the solution described is necessarily rooted in computing technology. In some examples, the data integration system described results in a significant decrease in resources required for data integration, while overcoming the technical limitations of known data integration tools.

In the example embodiment, a data integration system is provided. The data integration system includes a source database (or multiple source databases), a target database, and a configuration database. The data integration system also includes a data integration server which further includes at least a processor and a memory. The processor is configured to perform the functions described herein and, more specifically, to integrate data from one or more tables from the source database(s) at the target database using a configuration-driven approach. In at least some examples, the functions performed by the processor are stored on the memory or made available to the processor from an external system.

The data integration server includes modules to provide the methods described. The modules include: (1) a library module; (2) a configuration module; (3) a metadata module; (4) a code generation module; (5) a code execution module; and (6) a snapshot management module.

In an example embodiment, the data integration server may facilitate integration of data from source databases to any target database with any DBMS to meet business needs in a data center. The data integration system (also referred to as a "Smart Data Integrator" or an "SDI") may facilitate integration where source or target databases use any suitable DBMS including, for example, Oracle, IBM DB/2, Microsoft SQL Server, MySQL, Postgre SQL, Sybase and Teradata.

In an example embodiment, the source, target, and configuration databases may be physically resident in distinct servers. In a second embodiment, the databases are resident within shared servers. In a third embodiment, some of the databases are co-resident within a shared server and some reside on a distinct server. The databases may be configured to utilize any suitable DBMS including, for example, Oracle, IBM DB/2, MySQL, and Microsoft SQL Server. The source database(s) generally include any suitable information used within a datacenter that may be integrated. The target database may be any database desirable use by business intelligence or analytics including, for example, a data warehouse or a data silo.

The data integration server is configured to receive a library of object definitions defining relationships between a set of data elements and a set of data relationships in the source database. In an example embodiment, the library (or "SDI Library") is defined using a library module. The library is a collection of data object definitions that describes all data elements and all possible relationships among them available in the source databases. In the example embodiment, the library can be used to fully define source-to-target mapping and configuration data. As described in more detail below, the library is used, in part, to generate metadata that is, in turn, used by the code generation module to create the data integration code.

In the example embodiment, the library includes at least four types of data object definitions: (1) dataset, (2) dataset attribute, (3) dataset table, and (4) dataset table relationship. Dataset definitions define groups of related data elements. More specifically, each dataset includes a particular group of elements relating to a common characteristic. Dataset definitions further define the relationship between datasets, subject areas, dataset types, and data layers. For example, in the case of insurance claim processing, datasets may include, members, member physical addresses, member mailing addresses, member primary language, member secondary language, member Medicaid information, member Medicare information, member primary care physician information, member primary care physician billing entity, member primary care physician network, member primary phone, member mobile phone, member home phone, member business phone, member enrollment coverage, and member enrollment coverage frequency. As is evident from the foregoing list of datasets, each dataset relates to a common characteristic (i.e., member) and has the same overlapping subject area ("member"). In insurance claim processing systems, other subject areas may include, without limitation, authorization, claim, clinical, enrollment, health plan, member, pharmacy, provider, reference data, and vendor. As explained below, each dataset is associated with corresponding underlying elements ("attributes"). Datasets are also associated with dataset types explaining how the dataset was created. In one example, dataset types may be standard (i.e., a dataset type that pre-existed in the underlying source data) or custom (i.e., a dataset type that was created for the integration). Dataset types are additionally associated with data layers which describe where the datasets are available. Data layers may include conformed (or "cleansed"), raw, application, sandbox, and purpose built data mart.

As such, the dataset definitions can be described as a "unit" of the libraries. Dataset definitions may describe, for example, relationships between particular data and other groupings. By contrast, dataset attributes may be described as a "stack" of related data elements for each group identified in the dataset definitions. For example, in the cases of insurance claim processing described above, each dataset identified is associated with several dataset attributes. For example, the datasets above included definitions for "members" and "authorization". Dataset attributes may exist corresponding to the member dataset including, for example, member identification number, member last name, member first name, member middle name, member date of birth, member date of death, member email, member gender, member tenant code, and definitional attributes such as source data key, source member key, and source internal key. Likewise, dataset attributes may exist corresponding to the authorization dataset along with authorization identifier, source internal key, source member key, and source data key. Each dataset may include attributes for joining or connecting to other datasets. Dataset attribute definitions include entries for each dataset attribute along with an associated dataset name (to which the dataset attribute corresponds), a database name (where the attribute resides), a table name (where the attribute resides within the database), and a column name (where the attribute resides within the table).

Dataset table definitions represent the list of underlying tables used to form the datasets. As such, dataset table definitions include an identifier for at least each dataset, a database name where the dataset is located, a table name where the dataset is located within the database, a join level, a relationship name (indicating which datasets are related to the dataset), a record type, and a record filter. Dataset table relationship definitions provide inventories of the possible relationships between the tables used in the dataset (set out in the dataset table definitions). As such, the dataset table relationship defines parent-child relationships between databases, tables, and columns, along with relationship names for each relationship grouping. The dataset table relationship definitions typically include values for parent database name, parent table name, child database name, child table name, parent column name, child column name, and relationship name.

In some embodiments, the library module may be configured to provide additional features including: (a) maintaining a history of library information (e.g., storing historic or archived libraries); (b) supporting custom or purpose built data marts which can be loaded to the library as a customized library; and (c) automatically loading libraries based on a structured file input. The library module allows the data integration server to efficiently identify relationship between objects and key inputs that are used in data integration.

As explained above, the library module may provide libraries with one or more of datasets, dataset attributes, dataset tables, and dataset relationships. Thus, in some examples, the data integration server is configured to receive the library of object definitions defining relationships between a set of data elements and a set of data relationships in the source database. In such examples, the library includes object definitions for at least one of datasets, dataset attributes, dataset tables, and dataset relationships.

The data integration server is also configured to receive a collection of configuration data from the configuration database, where it is stored. The collection of configuration data includes information for mapping the source database to the target database. The configuration data may also be referred to as initiating information or intake information. In one example, the configuration data includes mapping information for (a) defining source-to-target mapping, (b) transformation rules for data, (c) default values for data (e.g., default values for a particular column in a table), (d) keys, and (e) column sequence information within a table. In another example, the configuration data also includes process information including (a) process name(s), (b) target object(s), (c) refresh method(s), (d) frequency information, (e) snapshot information, (f) process definition (i.e., whether processes are single step or multi-step), (g) refresh frequency, (h) refresh type, and (i) snapshot management information. In another example, the configuration data includes filter information reflecting filters applied for data selection. In at least one example, configuration data includes all of the information described above. As described herein, configuration information is used as an input for creating the metadata used to create data integration code.

As described below, application of the library and the configuration data allows for automation data integration without requiring any understanding of relationships between tables. Similarly, application of the library and the configuration data eliminates a need for defining join conditions in source-to-target mapping. When configuration data is updated, data integration code may be automatically updated without writing new ETL code (or other code) based on underlying changes in mapping or selection criteria reflected in the configuration data. In some embodiments, the configuration module records archives or historical record of configuration data. The configuration module is generally configured to define, maintain, and update configuration data. Like the library module, the configuration module may receive a file to automatically load configuration data. The configuration module may also be used to derive lineage and provide transparent code logic, as described below.

The data integration server is also configured to apply a metadata module to the collection of configuration data to generate a set of metadata information. The metadata module processes configuration data from the configuration module (described above) to create metadata information. The metadata module also uses the library to map library information and prepare data required for generation of data integration code. The metadata is generated through an automated process that can apply to any new or updated configuration data. Metadata information is created based on the information from configuration data and information available in library module. Configuration information is translated into metadata information to enable automatic code generation. Requirements for data integration system are translated into metadata to represent source to target mapping while leveraging library information. In the example embodiment, metadata is stored for the current configuration data and in other examples, data is maintained in archives.

The data integration server is also configured to apply the set of metadata information and the library of object definitions to a code generation module to generate data integration code. The code generation module (or code generation process) receives metadata and library information and generates all data integration code. The code generation module is robust, flexible, and accommodates a variety of possible complexities. The code generation module generates modular code logic for complex process to provide enhanced better performance. In some embodiments, the code generation module generates the data integration code with modular code logic for multiple stages. In such examples, the code generation module creates code including an (a) integration stage at a first level, (b) an update stage at a second level, and (3) an archive stage at a third level.

The first level for data integration generates code for integration including the following: (i) cleanup queries for work tables; (ii) insert queries to load data into work table; (iii) temporary data tables required for updating optional attributes; and (iv) update queries to update work table for optional attributes. The second level for data integration generates code for updating including the following: (i) full refresh of data using (A) queries to truncate data in target table; and (B) queries to load data from work into target; and (ii) incremental update using (A) queries to delete records available in work and target table; and (B) insert queries to load data from work to target table. The third level for data integration generates code for archiving including the following: (i) managing history by (A) creating queries to move data from incremental data to history table. Once the code generation module is executed, code for ETL is generated and loaded into a process query table containing ETL logic.

As explained above, in some examples, the data integration server uses configuration data reflecting mapping data to create metadata. In other examples, the data integration server applies filters from the configuration data and process information to create metadata. As such, the data integration server receives the collection of configuration data further including process information and filter information and applies the metadata module to the collection of configuration data to generate the set of metadata information.

The code generation module is capable of creating code for multiple types of data updates (or loads) including: (a) full updates or refreshes, (b) incremental updates or refreshes, or (c) historical loading. In some examples, the code generation module is configured to maintain a history of generated code at the process level and to log generation of code into a log table for debugging. In at least some examples, the code generation module creates code that can be decomposed into single inert operations and/or multi-step (insert/update) operations.

The code generation module may be used, in most embodiments, to create code as one job for all processes. In at least some examples, changes to underlying data such as configuration data, libraries, or metadata, can trigger generation of updated integration code by the code generation module. In such examples, the data integration server scans for (or otherwise receives) current versions of the underlying data (i.e., configuration data, libraries, and/or metadata) and determines whether the underlying data has been changed. On identifying any change to the underlying data, the code generation module updates the data integration code. Thus, in some examples, the data integration server (a) receives a current version of at least one of the library of objection definitions, the collection of configuration data, and the set of metadata information, (b) processes the current version to determine whether at least one of the library of objection definitions, the collection of configuration data, and the set of metadata information have changed, and (c) generates a revision to the data integration code upon determining that at least one of the library of objection definitions, the collection of configuration data, and the set of metadata information have changed.

The data integration server is also configured to execute the data integration code to integrate a set of information from the source database in the target database. The code execution module reads queries from the process query table to perform the data integration from source database(s) to target database. In the example embodiment, the code execution module executes the data integration code in sequential order. The code execution module also includes an audit sub-module that captures code executed for later auditing. More specifically, executed code is logged into an audit table containing at least start time, end time, impacted record count(s), and any error messages. In some examples, the code execution module also may use a dynamic schedule that can be controlled by configuration data to stage the execution of code to, for example, minimize resource utilization. The code execution module also allows for processing jobs at multiple frequencies. In some examples, the code execution module may create active batch jobs for each target to call the code execution module. In such examples, the batch jobs may take the process name as an input parameters and may be configured to send notifications on job status including custom error messages.

Upon execution, the data integration server updates the target database based on applying the data integration code to source databases. The data integration server gathers load data from source database(s), transforms data using temporary tables as specified in the data integration code, and loads the transformed data to the target database. In some examples, the data integration server also may include and execute a snapshot module to create snapshot of target (such as data marts) objects at various intervals that may be configured. Snapshotting intervals may be, for example, daily, weekly, monthly, annually, or any other schedule. Snapshots may be retained for archival and roll-back purposes. Snapshot archival may be set, for example, in configuration data. In some examples, the data integration server may interact with a data movement server (or "Turbo Data Mover") configured to provide large-scale mass migration of data from source database(s) to target database(s).

Generally, the systems and methods described herein are configured to perform at least the following steps: receiving a library of object definitions defining relationships between a set of data elements and a set of data relationships in the source database; receiving a collection of configuration data including information for mapping the source database to the target database; applying a metadata module to the collection of configuration data from the configuration database to generate a set of metadata information; applying the set of metadata information and the library of object definitions to a code generation module to generate data integration code; executing the data integration code to integrate a set of information from the source database in the target database; receiving the collection of configuration data further including process information and filter information; applying the metadata module to the collection of configuration data to generate the set of metadata information; receiving the library of object definitions defining relationships between a set of data elements and a set of data relationships in the source database, wherein the library includes object definitions for at least one of datasets, dataset attributes, dataset tables, and dataset relationships; receiving a current version of at least one of the library of objection definitions, the collection of configuration data, and the set of metadata information; processing the current version to determine whether at least one of the library of objection definitions, the collection of configuration data, and the set of metadata information have changed; generating a revision to the data integration code upon determining that at least one of the library of objection definitions, the collection of configuration data, and the set of metadata information have changed; generating the data integration code with modular code logic for a multiple stages including an integration stage, an update stage, and an archive stage; generating the data integration code such that the data integration code is decomposable into single insert operations or multi-step operations; receiving the collection of configuration data including the information for mapping the source database to the target database and further including transformation rules, default values, business keys, and column sequences; and applying the metadata module to the collection of configuration data to generate the set of metadata information.

Figure 2:
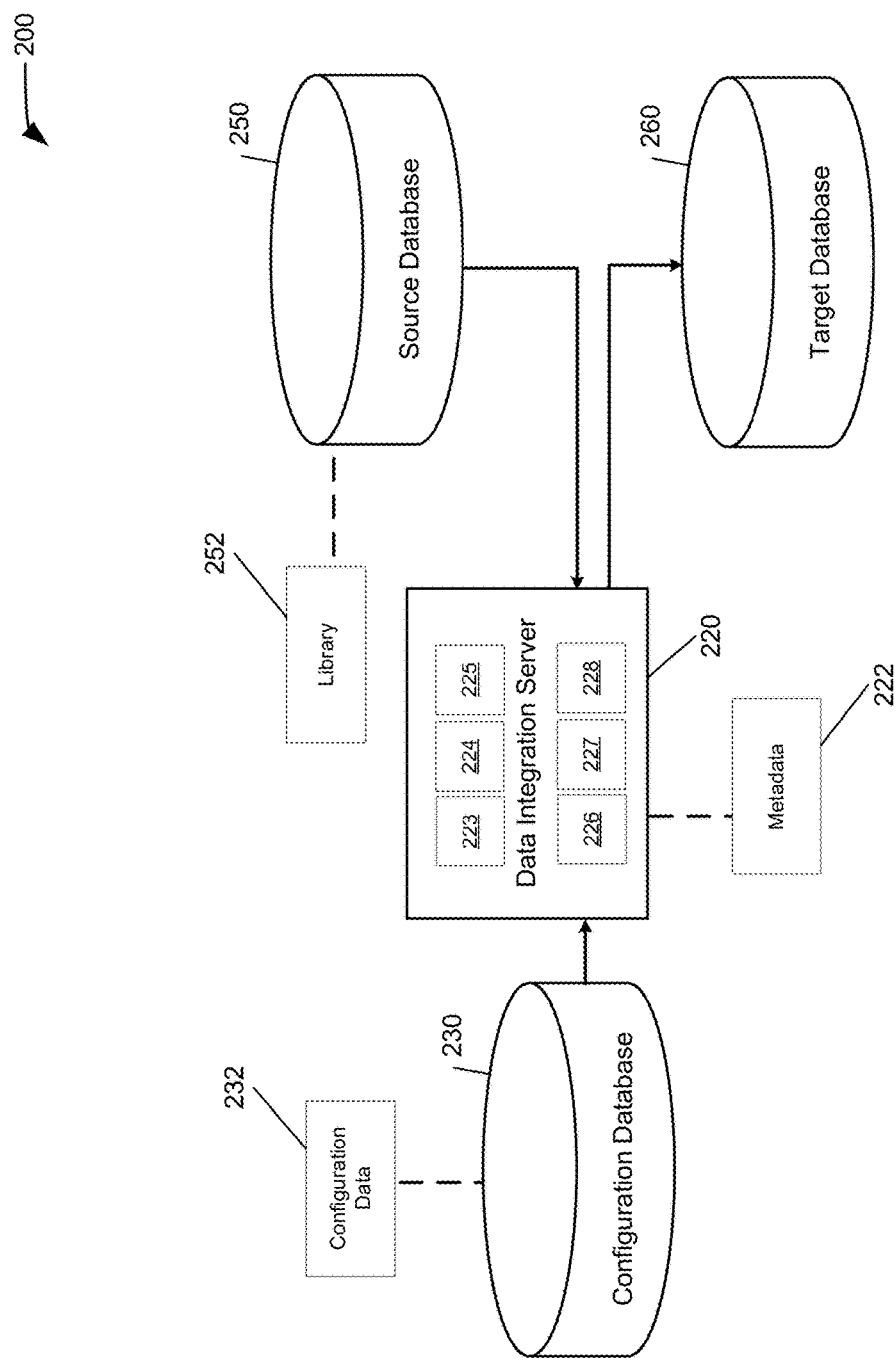
FIG. 2 is a functional block diagram of a data integration system that may be deployed using the computing devices shown in FIG. 1.

FIG. 1 is a functional block diagram of an example computing device that may be used in the data integration system described, and may represent the data integration server, the source database, the target database, and the configuration database (all shown in FIG. 2). Specifically, computing device 100 illustrates an exemplary configuration of a computing device for the systems shown herein, and particularly in FIG. 2. Computing device 100 illustrates an exemplary configuration of a computing device operated by a user 101 in accordance with one embodiment of the present invention. Computing device 100 may include, but is not limited to, the data integration server, the source database, the target database, and the configuration database (all shown in FIG. 2), other user systems, and other server systems. Computing device 100 may also include servers, desktops, laptops, mobile computing devices, stationary computing devices, computing peripheral devices, smart phones, wearable computing devices, medical computing devices, and vehicular computing devices. Alternatively, computing device 100 may be any computing device capable of the described methods for data integration from a source database(s) to a target database. In some variations, the characteristics of the described components may be more or less advanced, primitive, or non-functional.

In the exemplary embodiment, computing device 100 includes a processor 111 for executing instructions. In some embodiments, executable instructions are stored in a memory area 112. Processor 111 may include one or more processing units, for example, a multi-core configuration. Memory area 112 is any device allowing information such as executable instructions and/or written works to be stored and received. Memory area 112 may include one or more computer readable media.

Computing device 100 also includes at least one input/output component 113 for receiving information from and providing information to user 101. In some examples, input/output component 113 may be of limited functionality or non-functional as in the case of some wearable computing devices. In other examples, input/output component 113 is any component capable of conveying information to or receiving information from user 101. In some embodiments, input/output component 113 includes an output adapter such as a video adapter and/or an audio adapter. Input/output component 113 may alternatively include an output device such as a display device, a liquid crystal display (LCD), organic light emitting diode (OLED) display, or "electronic ink" display, or an audio output device, a speaker or headphones. Input/output component 113 may also include any devices, modules, or structures for receiving input from user 101. Input/output component 113 may therefore include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output and input device of input/output component 113. Input/output component 113 may further include multiple sub-components for carrying out input and output functions.

Computing device 100 may also include a communications interface 114, which may be communicatively coupleable to a remote device such as a remote computing device, a remote server, or any other suitable system. Communication interface 114 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX). Communications interface 114 is configured to allow computing device 100 to interface with any other computing device or network using an appropriate wireless or wired communications protocol such as, without limitation, BLUETOOTH®, Ethernet, or IEE 802.11. Communications interface 114 allows computing device 100 to communicate with any other computing devices with which it is in communication or connection.

FIG. 2 is a functional block diagram of a data integration system 200 that may be deployed using the computing device 100 (shown in FIG. 1). Data integration system 200 is process to illustrate the data integration process showed herein. Specifically, data integration system 200 includes components including data integration server 220, configuration database 230, source database 250, and target database 260. Devices 220, 230, 250, and 260 include systems and designs similar to those described in computing device 100.

Source database 250 is associated with a library 252 of object definitions defining relationships between a set of data elements and a set of data relationships in the source database 250. In the example embodiment, library 252 may be stored at data integration server 220. In other embodiments, library 252 is available to data integration server 220 through a secondary device. Configuration database 230 includes configuration data 232. In the example embodiment, configuration data 232 includes information for mapping source database 250 to target database 260. Data integration server 220 includes a plurality of modules 223, 224, 225, 226, 227, and 228 described herein. Specifically, the modules includes library module 223, configuration module 224, metadata module 225, code generation module 226, code execution module 227, and snapshot management module 228.

In operation, data integration server 220 may apply library module 223 to receive library 252 and apply configuration module 224 to receive configuration data 232. In other examples, data integration server 220 receives library 252 and configuration data 232 from storage at any of devices 220, 230, 250, and 260. Data integration server 220 applies metadata module 225 to configuration data 232 to generate metadata information (not shown). Data integration server 220 applies metadata information and library 252 to code generation module 226 to generate data integration code. Data integration server 220 applies data integration code using code execution module 227 and causes integration of data from source database 250 at target database 260. In some examples, data integration server 220 uses snapshot management module 228 to manage snapshots of data at target database 260.

Figure 3:
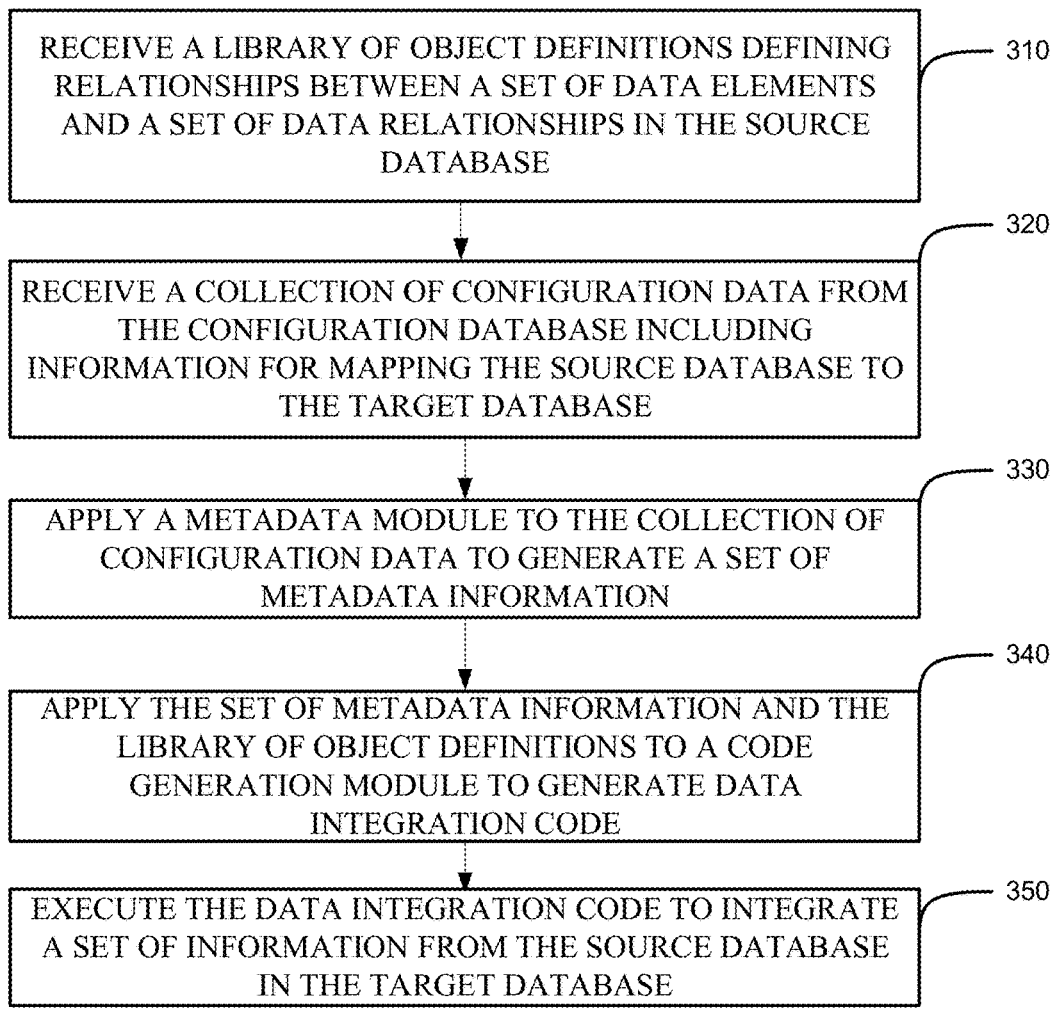
FIG. 3 is a flow diagram representing the data integration method from the perspective of the data integration server shown in FIG. 2.

FIG. 3 is a flow diagram representing the data integration method 300 from the perspective of the data integration server 220 (shown in FIG. 2). Data integration server 220 is configured to receive 310 a library of object definitions defining relationships between a set of data elements and a set of data relationships in the source database. Data integration server 220 is also configured to receive 320 a collection of configuration data from the configuration database including information for mapping the source database to the target database. Data integration server 220 is additionally configured to apply 330 a metadata module to the collection of configuration data to generate a set of metadata information. Data integration server 220 is also configured to apply 340 the set of metadata information and the library of object definitions to a code generation module to generate data integration code. Data integration server 220 is additionally configured to execute 350 the data integration code to integrate a set of information from the source database in the target database.

Figure 4:
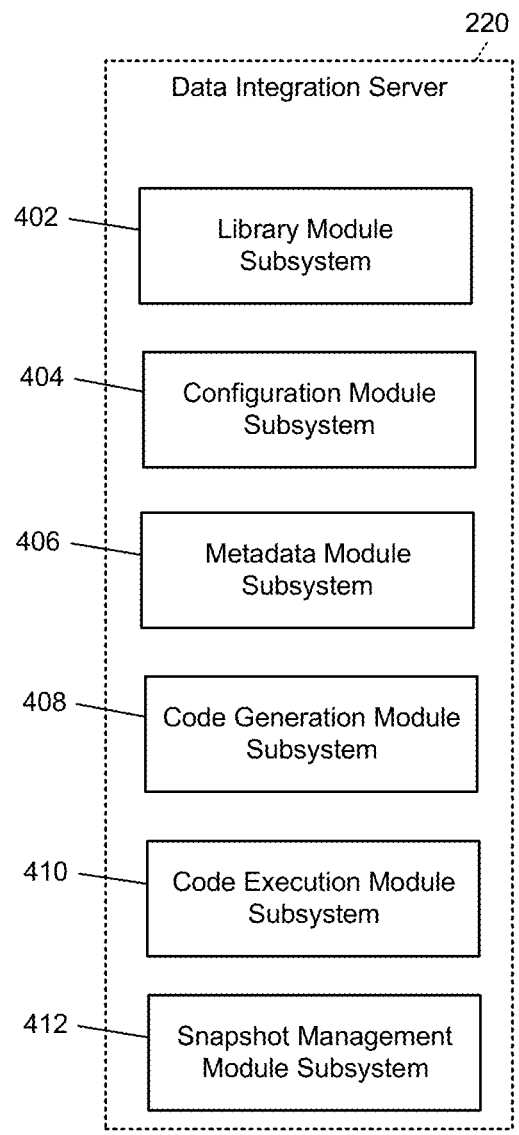
FIG. 4 is a diagram of elements of one or more example computing devices that may be used in the system shown in FIG. 2.

FIG. 4 is a diagram of elements of one or more example computing devices that may be used in the system shown in FIG. 2. Specifically, data integration server 220 includes a plurality of components 402, 404, 406, 408, 410, and 412 that may be used to perform the methods described herein.

In particular, the data integration server includes multiple component modules for data integration. The modules include: (1) a library module 402 for defining and processing libraries of object definitions defining relationships between a set of data elements and a set of data relationships in source databases; (2) a configuration module 404 for defining and processing configuration data including (i) mapping information for mapping the source database(s) to the target database, transformation rules, default values, business keys, and column sequence, (ii) process information for defining and processing process names, target objects, refresh methods, refresh frequencies, snapshot configurations, process methods (e.g., single-step or multi-step), refresh type, and snapshot management, and (iii) and filter information for defining and processing filter configuration information applied in data selection; (3) a metadata module 406 for converting configuration data into a set of metadata; (4) a code generation module 408 used to process the metadata and libraries into data integration code; (5) a code execution module 410 for managing, deploying, and executing the data integration code; and (6) a snapshot management module 412 for managing and executing snapshots of integrated data (e.g., data marts). Using these component modules and other features described herein, the data integration server and system provide technological solutions to the problems of data integration described herein. Notably, the systems and methods described overcome known deficiencies in known data integration systems. For example, the data integration server avoids resource intensive query statements in source-to-target mapping that are required in known data integration systems, and thereby improves the functioning of databases. The data integration server also avoids manual generation of code for data integration required in known data integration systems and thereby avoids errors, inefficiencies, and risks which are common in such systems. Further, the modules described and the metadata model are novel improvements that are not conventionally known in computing. The modules and metadata model thus further represent improvements over known data integration systems.

Figure 5:
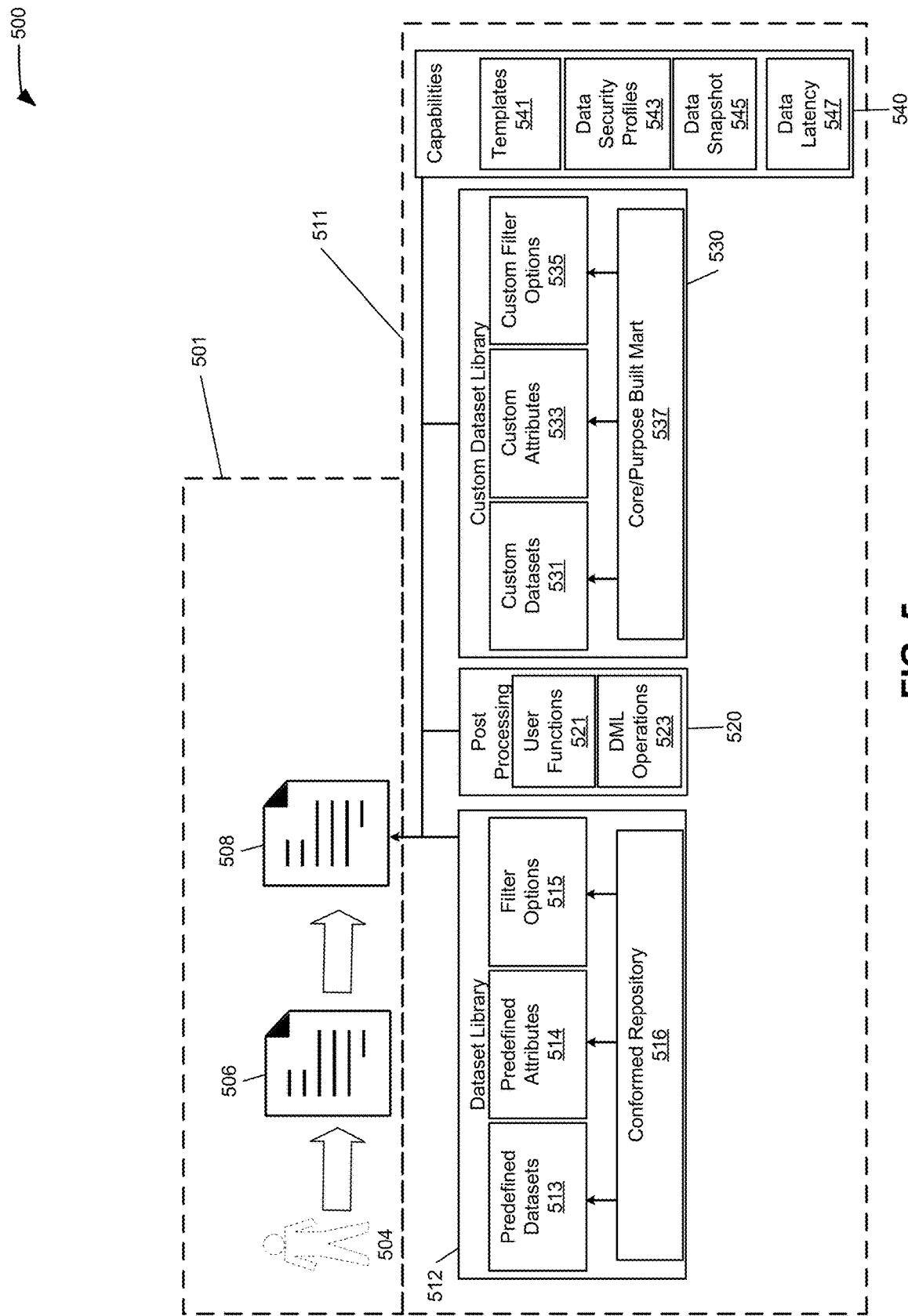
FIG. 5 is a first diagram of the framework and components used by the data integration system of FIG. 2 to perform the data integration described in FIG. 3.
Figure 6:
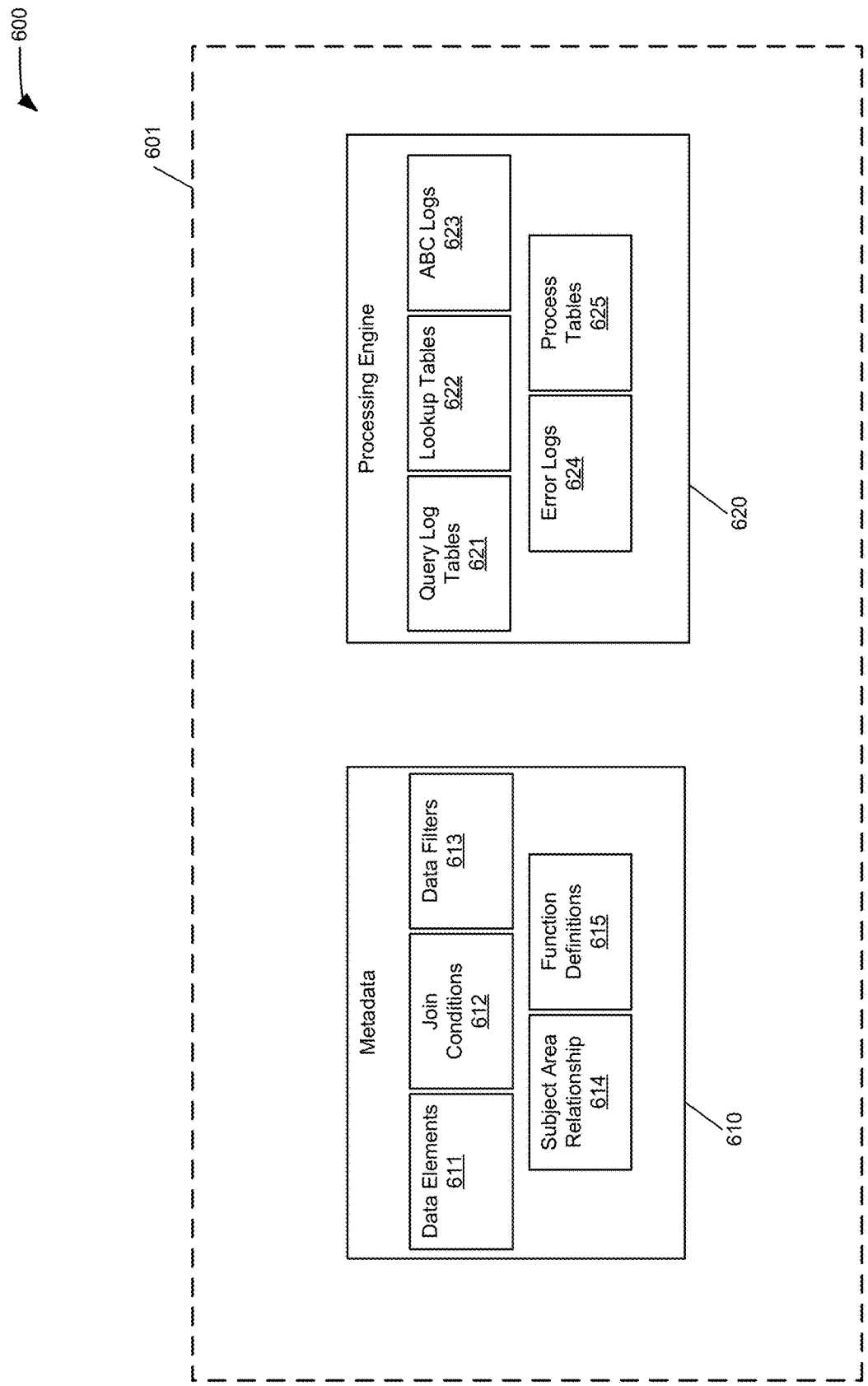
FIG. 6 is a second diagram of the framework and components used by the data integration system of FIG. 2 to perform the data integration described in FIG. 3.
Figure 7:
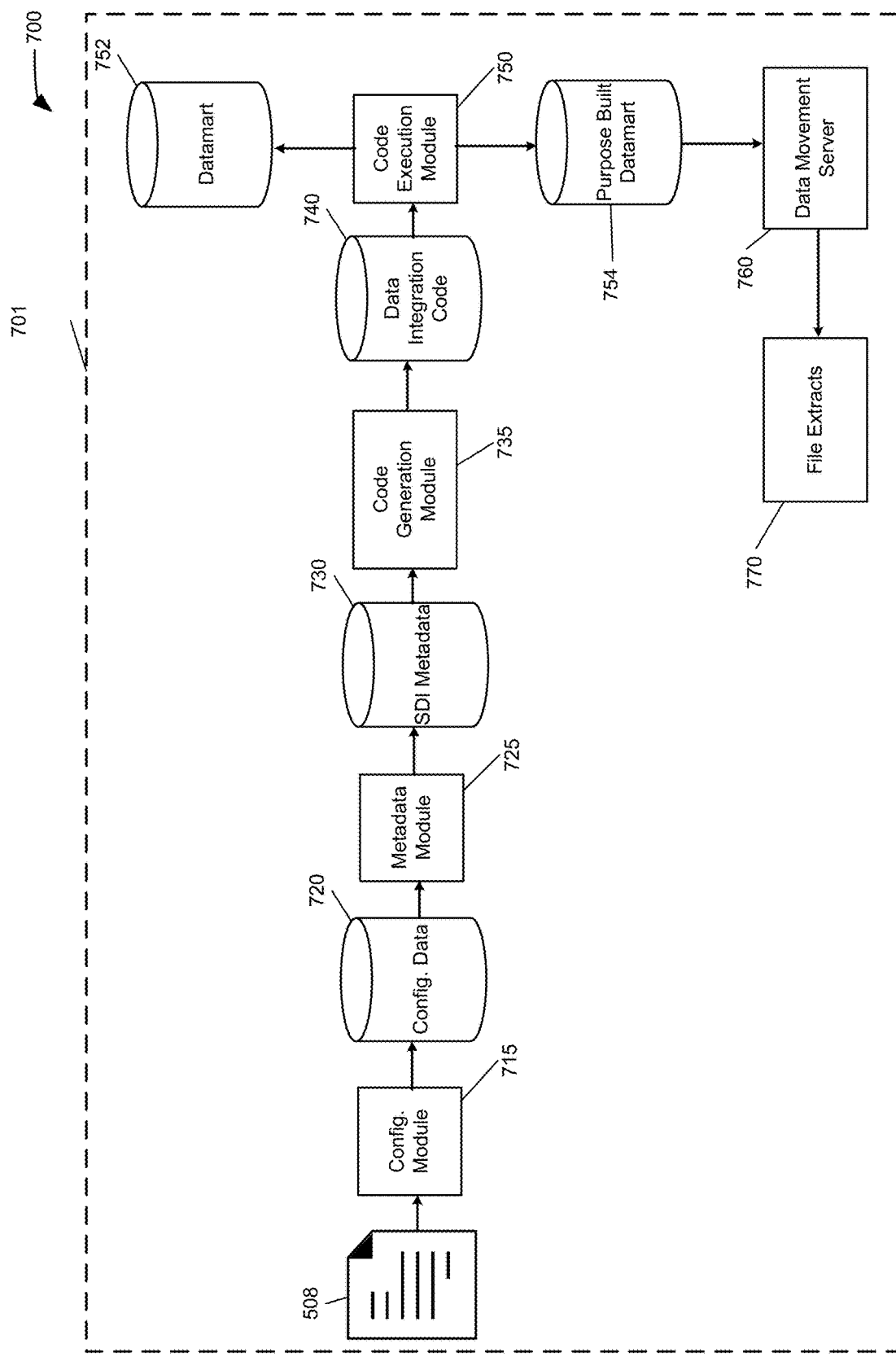
FIG. 7 is a third diagram of the framework and components used by the data integration system of FIG. 2 to perform the data integration described in FIG. 3.

FIGS. 5, 6, and 7 provide illustrations of frameworks and components used by the data integration system 200 (shown in FIG. 2) to perform the data integration process 300 (shown in FIG. 3.) FIG. 5 illustrates an upper and configuration layer of the data integration server 220 (shown in FIG. 2), FIG. 6 illustrates a metadata layer of the data integration server 220, and FIG. 7 illustrates an execution (or orchestration) layer of the data integration server 220. Referring to FIG. 5, a first diagram of the framework and components is shown illustrating the upper layer 501 and configuration layer 511. At upper layer 501, a source-to-target mapping ("STTM") file 508 is indicated. In one respect, STTM file 508 can be generated based on input from a user such as a data analyst 504 based on analysis of STTM data 506. However, as described above and herein, at the configuration layer 511, STTM file 508 may also be defined based on configuration layer 511. More specifically, configuration layer 511 includes dataset library 512 which further includes definitions for predefined datasets 513, predefined attributes 514, filter options 515, and a conformed repository 516. As described above, dataset library 512 may also include dataset tables and dataset relationships. Filter option 515 may be applied for selecting data. Conformed repository 516 represents all standard source databases used by the data integration system 200.

Configuration layer 511 also includes post-processing functions 520 that may be applied to dataset library 512 and/or custom data library 530, including user-defined functions 521 and data manipulation language ("DML") functions 523.

Configuration layer 511 also includes custom data library 530 which further includes definitions for custom datasets 531, custom attributes 533, custom filter options 535, and core/purpose built data marts 537. Custom data library 530 and its components 531, 533, and 535 therefore represent configurable adjustments to the datasets 513, predefined attributes 514, and filter options 515. Core/purpose built data marts 537 are, as indicated, data marts that have been specially constructed for particular business intelligence ("BI") or similar functions, rather than primary source databases.

Configuration layer 511 also includes capabilities 540 used to assist with the functions of configuration layer 511 including template module 541, data security profiles 543, data snapshot module 545, and data latency management module 547.

Referring to FIG. 6, a second diagram 600 of the framework and components used by data integration system 200 (shown in FIG. 2) to perform the data integration process 300 (shown in FIG. 3) is shown. Diagram 600 illustrates a metadata layer 601 including metadata 610 and processing engine 620. Metadata 610 includes data elements 611, join conditions 612, data filters 613, subject area relationships 614, and function definitions 615. Processing engine 620 includes query log tables 621, lookup tables 622, ABC logs, 623, error logs 624, and process tables 625.

Referring to FIG. 7, a third diagram 700 of the framework and components used by data integration system 200 (shown in FIG. 2) to perform the data integration process 300 (shown in FIG. 3) is shown. Diagram 700 illustrates an execution (or orchestration) layer 701 wherein the STM input file 508 (also shown in FIG. 5) functions as library is used to provide the data integration described herein. Specifically, STM input file 508 is applied with a configuration module 715 which accesses configuration data 720. Configuration data 720 is applied to a metadata module 725 which generates metadata 730. Metadata 730 and STM input file 508 are applied to code generation module 735 to create data integration code 740 which is in turn executed by code execution module 750 to update a datamart 752 and/or a purpose built datamart 754. In some examples, the purpose built data mart 754 provides an output to a data movement server 760 such as Turbo Data Mover which may then provide an output to file extracts 770.

Figure 8:
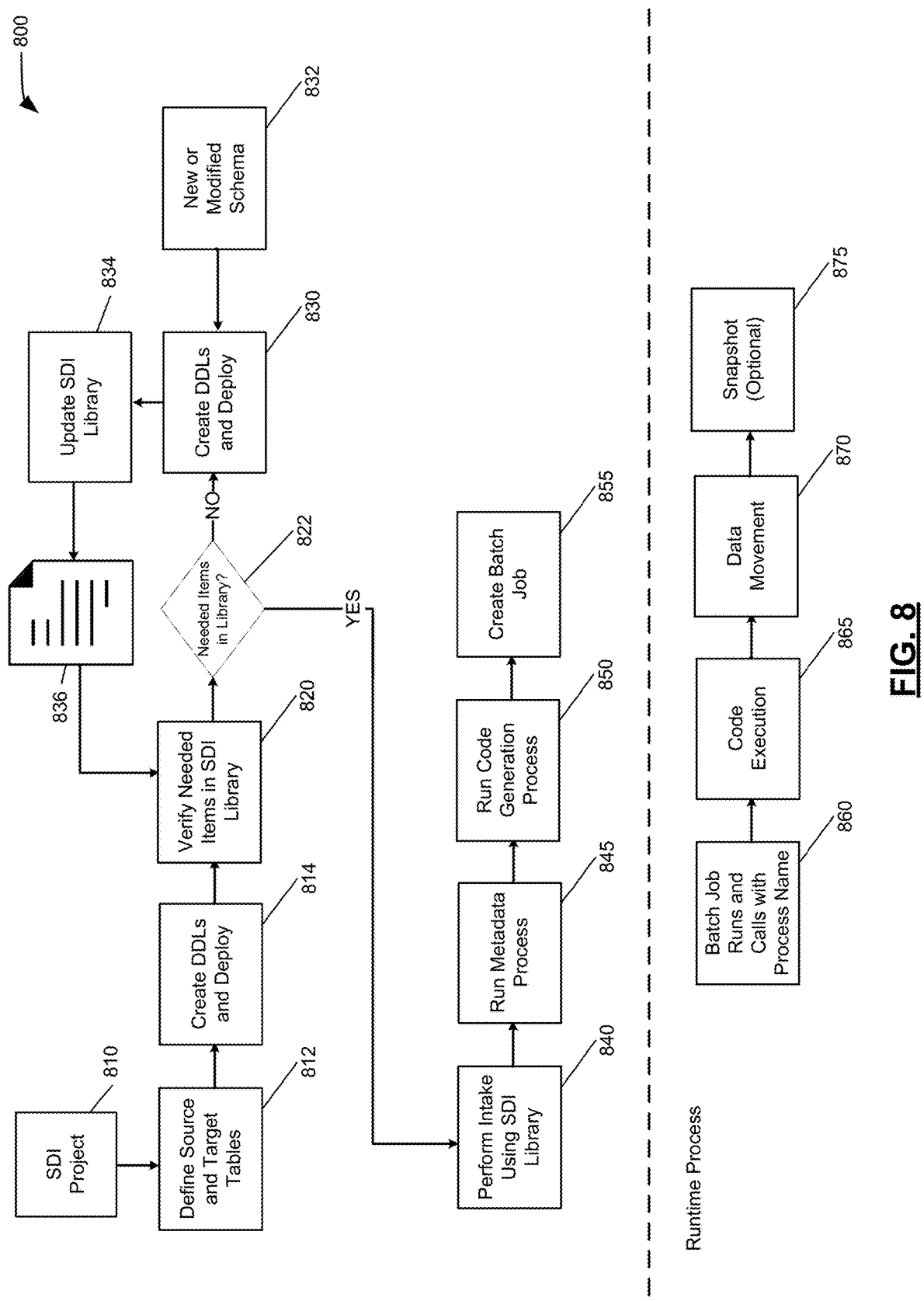
FIG. 8 is a first flow diagram of implementation steps used by the data integration system of FIG. 2 to perform the data integration described in FIG. 3.

FIG. 8 is a first flow diagram 800 of implementation steps used by the data integration system 200 (shown in FIG. 2) to perform the data integration process 300 (shown in FIG. 3). Initially, a Smart Data Integrator (or "SDI") project is instantiated 810 in data integration system 200. The SDI project is updated with defined source and target tables 812 which are provided within configuration data and are used with the metadata module to create 814 data definition language (or data description language) records (or "DDLs") and deploy packages. In some examples, DDLs and deploy packages further include object definitions which may both be included in the SDI library, as described in process 300. Data integration system 200 verifies 820 that all necessary items are in the SDI library. Specifically, data integration system 200 determines 822 whether necessary configuration data and object definitions are within the SDI library that are necessary (and/or sufficient) to generate data integration code. If data integration system 200 determines 822 that all necessary items are in the SDI library, data integration system 200 re-creates 830 DDLs and deploy packages and updates 834 the SDI library to create updated SDI library 836. In some examples, update 834 is completed based on new or modified schema 832 obtained by data integration system 200.

After an SDI library is obtained with all necessary items (whether or not a re-creation 330 of DDLs and deploy packages is required), data integration system 200 performs an intake process 840 using the SDI library and runs a metadata process 845 representing at least the application 330 of the metadata module to the collection of configuration data to generate metadata information. In the example embodiment, there is typically one intake file for each object (e.g., a CDO/SDO object). Data integration system 200 also runs a code generation process 850 representing the application 340 of the set of metadata information and the library of object definitions to the code generation module to generate data integration code. In some examples, such code generation includes the generation of all necessary database code to provide the functions described herein, including the generation of SQL (or similar codebase) statements to provide ETL functionality. Data integration system 200 may also create a batch job 855 using the generated data integration code. In one example, the batch job is created with the process name provided as a parameter. In such an example, the process name is unique and uses a standard naming convention and pattern.

Using this approach, all required DDLs and deploy packages are created prior to data integration using the SDI. Further, the table structures are available in each environment prior to the execution of code generation module.

In run-time, data integration system 200 runs batch job 860. The batch job 860 may specify the process name as a parameter. Data integration system 200 executes 865 the generated code, typically with each section of code associated with the corresponding process name. The generated code is executed based on an order determined by the batch job and the process identifier. Based in part on the configuration data, data integration system 200 moves data 870 from source to target. In some examples, data integration system 200 also takes a snapshot 875 to provide consistency, failback, and resiliency functionality.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A data integration system for integrating data from multiple sources using configuration based metadata, comprising:
   a source database;
   a target database;
   a configuration database;
   a data integration server comprising a processor and a memory, said data integration server in communication with said source database, said target database, and said configuration database, said processor configured to:
      receive a library of object definitions defining relationships between a set of data elements and a set of data relationships in the source database;
      receive a collection of configuration data from the configuration database including information for mapping the source database to the target database;
      apply a metadata module to the collection of configuration data to generate a set of metadata information;
      apply the set of metadata information and the library of object definitions to a code generation module to generate data integration code; and
      execute the data integration code to integrate a set of information from the source database in the target database.

2. The data integration system of claim 1, wherein said processor is further configured to:
   receive the collection of configuration data further including process information and filter information; and
   apply the metadata module to the collection of configuration data to generate the set of metadata information.

3. The data integration system of claim 1, wherein said processor is further configured to:
   receive the library of object definitions defining relationships between a set of data elements and a set of data relationships in the source database, wherein the library includes object definitions for at least one of datasets, dataset attributes, dataset tables, and dataset relationships.

4. The data integration system of claim 1, wherein said processor is further configured to:
   receive a current version of at least one of the library of objection definitions, the collection of configuration data, and the set of metadata information;
   process the current version to determine whether at least one of the library of objection definitions, the collection of configuration data, and the set of metadata information have changed; and
   generate a revision to the data integration code upon determining that at least one of the library of objection definitions, the collection of configuration data, and the set of metadata information have changed.

5. The data integration system of claim 1, wherein said processor is further configured to:
   generate the data integration code with modular code logic for a plurality of stages including an integration stage, an update stage, and an archive stage.

6. The data integration system of claim 1, wherein said processor is further configured to:
   generate the data integration code such that the data integration code is decomposable into single insert operations or multi-step operations.

7. The data integration system of claim 1, wherein said processor is further configured to:
   receive the collection of configuration data including the information for mapping the source database to the target database and further including transformation rules, default values, business keys, and column sequences; and
   apply the metadata module to the collection of configuration data to generate the set of metadata information.

8. A data integration server for integrating data from multiple sources using configuration based metadata comprising a processor and a memory, said data integration server in communication with a source database, a target database, and a configuration database, said processor configured to:
   receive a library of object definitions defining relationships between a set of data elements and a set of data relationships in the source database;
   receive a collection of configuration data including information for mapping the source database to the target database;
   apply a metadata module to the collection of configuration data from the configuration database to generate a set of metadata information;
   apply the set of metadata information and the library of object definitions to a code generation module to generate data integration code; and
   execute the data integration code to integrate a set of information from the source database in the target database.

9. The data integration server of claim 8, wherein the processor is further configured to:
   receive the collection of configuration data further including process information and filter information; and
   apply the metadata module to the collection of configuration data to generate the set of metadata information.

10. The data integration server of claim 8, wherein the processor is further configured to:
    receive the library of object definitions defining relationships between a set of data elements and a set of data relationships in the source database, wherein the library includes object definitions for at least one of datasets, dataset attributes, dataset tables, and dataset relationships.

11. The data integration server of claim 8, wherein the processor is further configured to:
    receive a current version of at least one of the library of objection definitions, the collection of configuration data, and the set of metadata information;
    process the current version to determine whether at least one of the library of objection definitions, the collection of configuration data, and the set of metadata information have changed; and
    generate a revision to the data integration code upon determining that at least one of the library of objection definitions, the collection of configuration data, and the set of metadata information have changed.

12. The data integration server of claim 8, wherein the processor is further configured to:
    generate the data integration code with modular code logic for a plurality of stages including an integration stage, an update stage, and an archive stage.

13. The data integration server of claim 8, wherein the processor is further configured to:
  generate the data integration code such that the data integration code is decomposable into single insert operations or multi-step operations.

14. The data integration server of claim 8, wherein the processor is further configured to:
  receive the collection of configuration data including the information for mapping the source database to the target database and further including transformation rules, default values, business keys, and column sequences; and
  apply the metadata module to the collection of configuration data to generate the set of metadata information.

15. A method for integrating data from multiple sources using configuration based metadata implemented by a data integration server, the data integration server including a processor and a memory, the data integration server in communication with a source database, a target database, and a configuration database, said method comprising:
  receiving a library of object definitions defining relationships between a set of data elements and a set of data relationships in the source database;
  receiving a collection of configuration data including information for mapping the source database to the target database;
  applying a metadata module to the collection of configuration data from the configuration database to generate a set of metadata information;
  applying the set of metadata information and the library of object definitions to a code generation module to generate data integration code; and
  executing the data integration code to integrate a set of information from the source database in the target database.

16. The method of claim 15, further comprising:
  receiving the collection of configuration data further including process information and filter information; and
  applying the metadata module to the collection of configuration data to generate the set of metadata information.

17. The method of claim 15, further comprising:
  receiving the library of object definitions defining relationships between a set of data elements and a set of data relationships in the source database, wherein the library includes object definitions for at least one of datasets, dataset attributes, dataset tables, and dataset relationships.

18. The method of claim 15, further comprising:
  receiving a current version of at least one of the library of objection definitions, the collection of configuration data, and the set of metadata information;
  processing the current version to determine whether at least one of the library of objection definitions, the collection of configuration data, and the set of metadata information have changed; and
  generating a revision to the data integration code upon determining that at least one of the library of objection definitions, the collection of configuration data, and the set of metadata information have changed.

19. The method of claim 15, further comprising:
  generating the data integration code with modular code logic for a plurality of stages including an integration stage, an update stage, and an archive stage.

20. The method of claim 15, further comprising:
  generating the data integration code such that the data integration code is decomposable into single insert operations or multi-step operations.

\* \* \* \* \*